Nov. 20, 1951     C. M. SEIBEL     2,575,533
ROTOR BLADE MOUNTING AND CONTROL
Filed April 16, 1947     2 SHEETS—SHEET 1
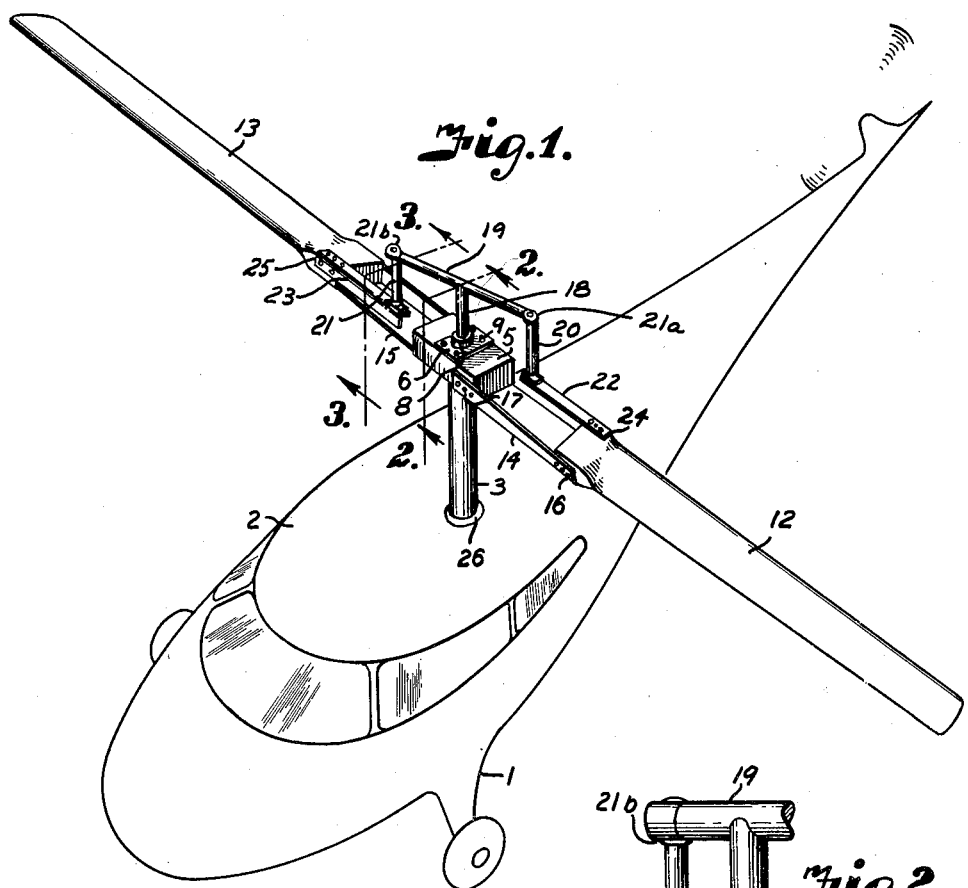
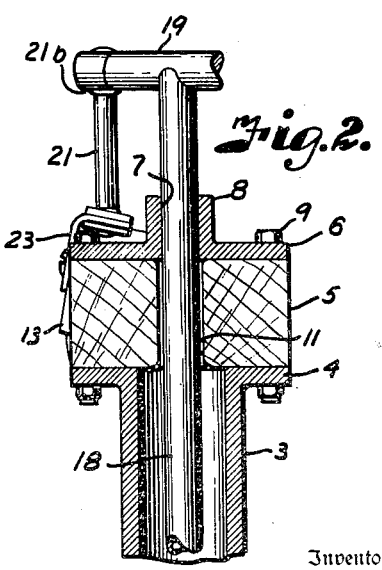
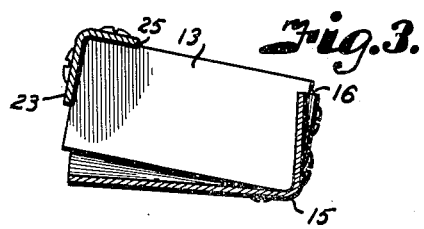
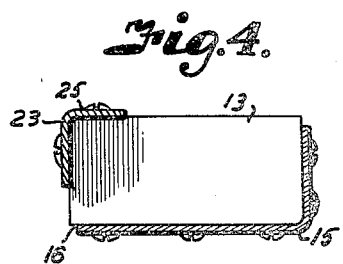
Inventor
Charles M. Seibel
By Fishburn & Mullendore
Attorneys Nov. 20, 1951 C. M. SEIBEL 2,575,533
ROTOR BLADE MOUNTING AND CONTROL
Filed April 16, 1947 2 SHEETS—SHEET 2
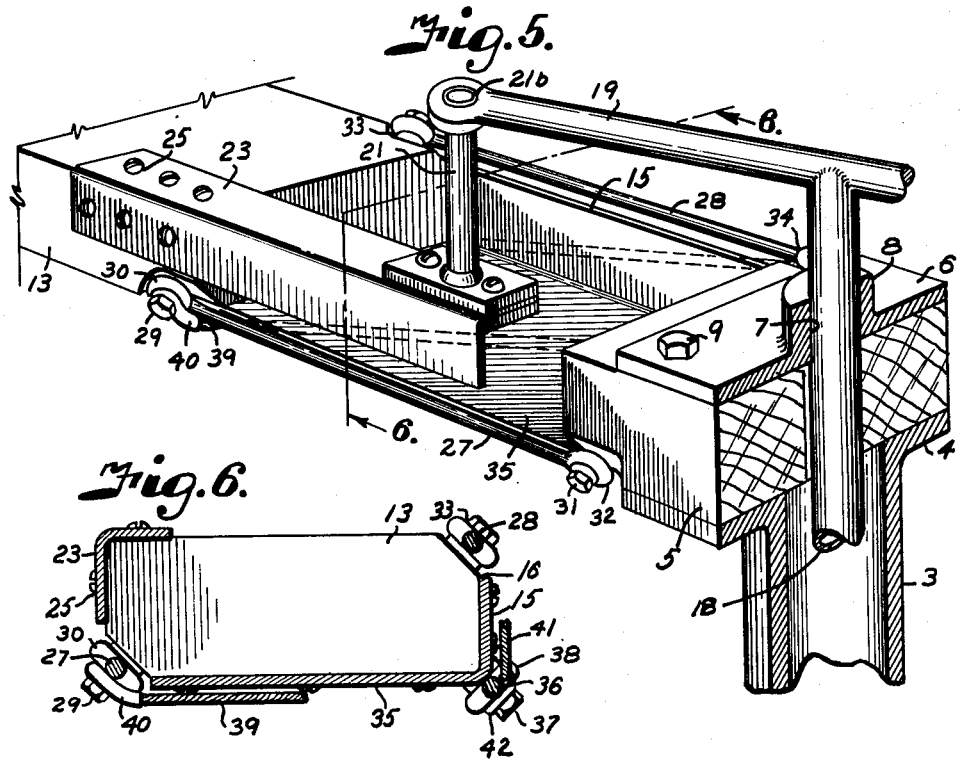
Inventor
Charles M. Seibel
By Fishburn & Mullendore
Attorneys Patented Nov. 20, 1951

2,575,533

UNITED STATES PATENT OFFICE 2,575,533

ROTOR BLADE MOUNTING AND CONTROL

Charles M. Seibel, Wichita, Kans.

Application April 16, 1947, Serial No. 741,702

9 Claims. (Cl. 170—160.43)

1

This invention relates to rotor blade attachments, and more particularly to attachments for rotor or propeller blades for helicopters, airplanes and the like for changing the pitch of the blades during operation of the aircraft.

It is the principal objects of the present invention to provide simplified means of attaching blades to the propeller or rotor hub of helicopters, airplanes and the like; to provide means for changing the pitch of the blades during operation of the helicopter, airplane or the like; to provide torsion means for attaching the blades to the rotor; and to provide a device of this character simple, economical to manufacture and efficient in operation.

In accomplishing these and other objects of the invention, I have provided improved details of structure, the preferred forms of which are illustrated in the accompanying drawings, wherein:

Fig. 1 is a perspective view of my rotor blade attachment shown in connection with an aircraft.

Fig. 2 is a vertical cross section taken on a line 2—2, Fig. 1.

Fig. 3 is a transverse cross section taken on a line 3—3, Fig. 1, showing the blade in torque position.

Fig. 4 is a view similar to Fig. 3 but showing the blade in normal position.

Fig. 5 is an elevational view of a modified form of my attachment particularly illustrating rods and cables having universal connection with the blade for strengthening the structure.

Fig. 6 is a cross section taken on a line 6—6, Fig. 5.

Referring more in detail to the drawings:

I designates an aircraft of helicopter type having a body 2. A tubular drive shaft 3 is rigidly supported by the body 2 and extends vertically above the body member. The upper end of the tubular member 3 is flanged as indicated at 4 upon which is mounted a hub 5. A plate 6 having a central bore 7 and provided with an upstanding boss 8 is provided to engage the top of the hub, the hub and plate being secured to the flange 4 of the drive shaft by bolts or the like 9 to form a rigid structure. The hub is also centrally bored as indicated at 11.

Blades 12 and 13 are adapted to be carried by the hub 5 and are adapted to be secured thereto in spaced relation longitudinally of the blades by sheet metal in the form of open sections such as angle members 14 and 15. One end of the angles 14 and 15 is rigidly secured to the ends of the blades as indicated at 16 and the opposite ends rigidly secured to the hub 5 as indicated at 17 (Fig. 1). While I have here shown the vertical leg of the angles 14 and 15 on the trailing edges of the blades 12 and 13, it will be obvious that they will operate as well on the leading edge of the blade on my device. The angle members 14 and 15 act as torsion members and are in tension during operation of the blades, and one leg of the angles extends substantially across the ends of the blades as best illustrated in Figs. 3 and 4.

Slidably located within the tubular shaft 3 and extending upwardly through the hub 5 and boss 8 of the plate 6 is a tubular member 18 having a cross member 19 rigidly secured to its upper end. Links 20 and 21 are secured to the respective outer ends of the cross member by ball and socket or universal connection as indicated at 21a and 21b. The lower ends of the links 20 and 21 are secured by ball and socket connection or the like to the free ends of pitch changing horns 22 and 23. The horns 22 and 23 are here shown to be angle-shaped and have their outer ends rigidly secured to the inner ends of the blades 12 and 13 as indicated at 24 and 25 so that movement of the tubular member 18 upwardly or downwardly through the drive shaft 3 will exert pressure on opposite sides of the blades to cause a torque or longitudinal twist in the angle members 14 and 15 and thus change the pitch of the blades 12 and 13. Other type or shape horns may be employed.

The aircraft is provided with the usual motor (not shown) having connection with the drive shaft 3, and the drive shaft with the pitch controlling mechanism including the tubular member 18 rotates with respect to the body of the aircraft by suitable bearing as indicated at 26.

Operation of the device as thus far described is as follows:

In flying the aircraft, when it is desired to change the pitch of the blade, upward movement of the tubular member 18 through suitable means (not shown) will cause upward lift of the horns 22 and 23 through links 20 and 21, thus raising the leading edges of the blades and lowering the trailing edges as illustrated in Fig. 1. Lowering of the tubular member 18 will act reversely on the blades to change the pitch thereof. It will be obvious that the angles 14 and 15 are so constructed that there will be a certain amount of torque as required without exceeding the yield stress of the material to change the pitch of the blade by movement of the tubular member 18. Lowering of the horns 22 and 23 will cause torque of the angle members 14 and 15 to allow the desired change in pitch of the blades.

It will be obvious that other attachments of the hub to the drive shaft may be desirable, for instance, the tubular member 18 may be provided with a slot through the hub to receive a pin for attaching the hub to the drive shaft for allowing a "see-saw" movement of the hub relative to the drive shaft, thus allowing the rotor to "see-saw" on the drive shaft.

Referring to the modified form of the invention shown in Fig. 5, the drive shaft, hub and blade attachment are identical with the invention shown in Figs. 1 to 4, inclusive, and the respective parts are so numbered.

In this form of invention, however, in addition to the rigid attachment of the angle members for the blades to the hub, I have provided rods 27 and 28 extending longitudinally from the hub to the blades on the leading and trailing edges of the blades. The rod 27 is attached to the lower corner of the end of the leading side of the blade 13 by a bolt 29 through a universal 30 and has its rear end secured to the lower corner of the hub 5 by a bolt 31 extending through a universal 32 of the hub 5. The rod 28 is likewise secured to the hub and end of the blade except that the forward end of the rod is secured to the upper edge of the end of the blade as indicated at 33 (Fig. 5), and the rear end of the rod is attached to the upper corner of the hub as indicated at 34. The angle member 15 has a leg 35 which extends substantially the width of the blade and hub, and a rod 36 extends along the vertex of the angle and has its inner end attached to the lower corner of the hub and its outer end attached to the lower corner of the blade by a bolt or the like 37 extending through a universal 38 in the end of the rod as best illustrated in Fig. 6. A cable 39 having a loop 40 on one end is also secured by the bolt 29 to the blade 13 and extends diagonally across the angle member 15 to the lower corner of the hub and is attached to the hub by a bolt or the like along with the rod 36. A cable 41 having a loop 42 is secured to the lower corner of the blade by the bolt 37 and has its inner end extending to the upper corner of the hub and is connected thereto by a bolt (not shown) along with the rod 28 as indicated at 34 (Fig. 5). This arrangement lends rigidity to the structure and upon manipulation of the tubular member 18 to change the pitch of the blade, the universal connections of the rods to the blades and hubs allows for movement of the respective parts.

Operation of this form of the invention as shown in Figs. 5 and 6 is substantially the same as in the form shown in Figs. 1 to 4, inclusive.

It will be obvious from the foregoing that I have provided an improved attachment for propeller or rotor blades, and particularly for changing the pitch thereof while the device is in operation. It will be obvious that various changes may be made in my device as shown without departing from the spirit of my invention.

What I claim and desire to secure by Letters Patent is:

1. A device for changing the pitch of rotor blades of an aircraft comprising, a rotatable shaft carried by the aircraft, a hub secured to an end of said shaft, rotor blades extending in opposite directions and substantially radially outwardly of the axis of rotation of the hub, the inner ends of the rotor blades being spaced from the hub, torsion means of sheet metal in the form of an open section rigidly secured to said hub and extending outwardly therefrom substantially in alignment with the blades, said torsion means having end portions rigidly secured to the bottom and one edge of said blades for securing the blades to the hub whereby portions of the torsion means intermediate the hub and blades are in tension during rotor rotation and twist longitudinally in change of pitch of the rotor blades, arms having one end attached to the opposite edges of said rotor blades, and means operable from said aircraft having connection with the free ends of said arms for changing the pitch of said rotor blades with respect to said hub.

2. A device for changing the pitch of rotor blades of aircraft comprising, a rotatable shaft carried by the aircraft, a hub secured to an end of said shaft, rotor blades extending in opposite directions and substantially radially outwardly of the axis of rotation of the hub, the inner ends of the blades being spaced from the hub, angle members rigidly secured to the hub and extending outwardly therefrom substantially in alignment with the rotor blades, the outer ends of said angle members being rigidly secured to the bottom and one edge of said rotor blades for securing the rotor blades to the hub whereby portions of the angle members intermediate the hub and rotor blades are in tension during rotor rotation and twist longitudinally in change of pitch of the rotor blades, arms having one end attached to the opposite edges of said rotor blades, and means operable from said aircraft having connection with the free ends of said arms for changing the pitch of said rotor blades with respect to said hub.

3. A device for changing the pitch of rotor blades of an aircraft comprising, a rotatable hollow drive shaft carried by the aircraft, a hub secured to an end of said drive shaft, rotor blades extending in opposite directions and substantially radially outwardly of the axis of rotation of the hub, the inner ends of the rotor blades being spaced from the hub, angle members rigidly secured to said hub and extending outwardly therefrom substantially in alignment with the rotor blades, the outer ends of said angle members being rigidly secured to the bottom and one edge of said rotor blades for securing the blades to the hub whereby portions of the angle members intermediate the hub and rotor blades are in tension during rotor rotation and twist longitudinally in change of pitch of the blades, arms having one end attached to the opposite edges of said rotor blades, and means extending through the hollow drive shaft and operable from said aircraft having connection with the free ends of said arms for changing the pitch of said rotor blades with respect to said hub.

4. A device for changing the pitch of rotor blades of an aircraft comprising, a rotatable hollow drive shaft carried by the aircraft, a hub secured to an end of said shaft, rotor blades extending in opposite directions and substantially radially outwardly of the axis of rotation of the hub, the inner ends of the blades being spaced from the hub, angle members rigidly secured to said hub and extending outwardly therefrom substantially in alignment with the rotor blades, the outer ends of said angle members being rigidly secured to the bottom and one edge of said rotor blades for securing the rotor blades to the hub whereby portions of the angle members intermediate the hub and rotor blades are in tension during rotor rotation and twist longitudinally in change of pitch of the rotor blades, arms having one end attached to the opposite edges of said rotor blades, and a shaft slidable in said hollow drive shaft operable from said aircraft and having universal connection with the free ends of said arms whereby the pitch of said rotor blades will be changed with respect to said hub upon longitudinal movement of said slidable shaft.

5. A device for changing the pitch of the rotor blades of an aircraft comprising, a substantially vertically arranged rotatable hollow drive shaft carried by the aircraft, a hub secured to the upper end of said drive shaft, rotor blades extending in opposite directions and substantially radially outwardly of the axis of rotation of the hub, the inner ends of the rotor blades being spaced from the hub, angle members rigidly secured to said hub and extending outwardly therefrom substantially in alignment with the rotor blades, the outer ends of said angle members being rigidly secured to the bottom and one edge of said rotor blades for securing the blades to the hub whereby the portions of the angle members intermediate the hub and rotor blades are in tension during rotor rotation and twist longitudinally in change of pitch of the rotor blades, angle members having one end attached to the opposite edges of said rotor blades, a tubular member slidably supported in said tubular drive shaft, a cross arm rigidly secured to the upper end of said tubular member, and links connecting the outer ends of said cross arm with the free ends of said last named angle members whereby raising and lowering of said tubular member in said hollow drive shaft will change the pitch of said rotor blades with respect to said hub.

6. A device for changing the pitch of the rotor blades of an aircraft comprising, a rotatable hollow drive shaft carried by the aircraft, a hub secured to an end of said drive shaft, rotor blades extending in opposite directions and substantially radially outwardly of the axis of rotation of the hub, the inner ends of the rotor blades being spaced from the hub, angle members rigidly secured to said hub and extending outwardly therefrom substantially in alignment with the rotor blades, the outer ends of said angle members being rigidly secured to the bottom and one edge of said blades for securing the blades to the hub whereby the portions of the angle members intermediate the hub and rotor blades are in tension during rotor rotation and twist longitudinally in change of pitch of the rotor blades, angle members having one end attached to the leading edges of said blades, a tubular member slidably supported in said hollow drive shaft, a cross arm rigidly secured to the upper end of said tubular member, links connecting the outer ends of said cross arm with the free ends of said last named angle members whereby raising and lowering of said tubular member in said hollow drive shaft will change the pitch of the rotor blades with respect to said hub, and bracing means connecting the hub and said rotor blades, said bracing means having universal connection with said hub and rotor blades to allow change of pitch of the rotor blades.

7. A device for changing the pitch of rotor blades of an aircraft comprising, a rotatable shaft carried by the aircraft, a hub secured to the upper end of said shaft, rotor blades extending in opposite directions and substantially radially outwardly of the axis of rotation of the hub, the inner ends of the rotor blades being spaced from the hub, means rigidly secured to said hub and to the bottom and one edge of said rotor blades for securing the blades to the hub whereby the portions of said means intermediate the hub and rotor blades are in tension during rotor rotation and twist longitudinally in change of pitch of the rotor blades, means secured to the opposite edges of said rotor blades operable from said aircraft to change the pitch of said rotor blades with respect to said hub, and bracing means connecting said hub with said rotor blades, said means having pivotal connection with the hub and rotor blades to allow for change in pitch of the rotor blades.

8. A device for attaching the blades of an airscrew to the hub of said airscrew, said attaching device comprising, angle members extending radially of the axis of rotation of a hub and having the innermost ends thereof rigidly secured to said hub, radially arranged blades spaced longitudinally thereof from the hub and rigidly secured to the outermost ends of the angle members whereby the portions of the angle members intermediate the hub and blades form torsional members which are in tension when the airscrew is rotated, said attaching device including means for holding the blades against bending of the angle members in the plane of rotation and perpendicular to the plane of rotation of said blades, and means connected to the blades for effecting longitudinal twisting action of said angle members for rotating the blades about a longitudinal axis parallel thereto to change the pitch of said blades.

9. A device for attaching blades of an airscrew to the hub of said airscrew, said attaching device including thin sheets of metal extending radially of the axis of rotation of a hub and each having one end rigidly secured to said hub, radially arranged blades spaced longitudinally thereof from the hub and rigidly secured to the outer ends of the thin sheets of metal, the portions of the thin sheets of metal intermediate the hub and blades being in the form of open section torsional members which are in tension when the airscrew is rotated, and means connected to the blades for effecting longitudinal twisting action of the intermediate portions of said thin sheets of metal for rotating the blades about an axis substantially parallel to the longitudinal axis of the blades to change the pitch of said blades.

CHARLES M. SEIBEL.

REFERENCES CITED

The following references are of record in the file of this patent:

UNITED STATES PATENTS

| Number | Name | Date |
| --- | --- | --- |
| 1,992,015 | Rutherford et al. | Feb. 19, 1935 |
| 2,088,413 | Hafner | July 27, 1937 |
| 2,402,349 | Sikorsky | June 18, 1946 |
| 2,418,030 | Hirsch | Mar. 25, 1947 |
| 2,495,523 | Hays | Jan. 24, 1950 |

FOREIGN PATENTS

| Number | Country | Date |
| --- | --- | --- |
| 385,074 | Great Britain | Dec. 22, 1932 |
| 476,596 | Great Britain | Dec. 13, 1937 |
| 541,206 | Great Britain | Nov. 17, 1941 |
| 273,604 | Italy | Apr. 25, 1930 |
| 692,503 | France | Aug. 4, 1930 |